United States Patent
Gunawan et al.

(10) Patent No.: US 10,352,797 B2
(45) Date of Patent: Jul. 16, 2019

(54) TUNABLE SHOCK SENSOR WITH PARALLEL DIPOLE LINE TRAP SYSTEM

(71) Applicant: International Business Machines Corporation, Armonk, NY (US)

(72) Inventors: Oki Gunawan, Westwood, NJ (US); Norma E. Sosa, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/729,403

(22) Filed: Oct. 10, 2017

(65) Prior Publication Data

US 2019/0107452 A1    Apr. 11, 2019

(51) Int. Cl.
| | |
|---|---|
| *G01L 5/00* | (2006.01) |
| *G01L 1/20* | (2006.01) |
| *G01P 15/04* | (2006.01) |
| *H04L 9/06* | (2006.01) |
| *F16C 32/04* | (2006.01) |
| *H02N 15/00* | (2006.01) |
| *H01H 35/14* | (2006.01) |

(52) U.S. Cl.
CPC .............. *G01L 5/0052* (2013.01); *G01L 1/20* (2013.01); *G01P 15/04* (2013.01); *F16C 32/04* (2013.01); *F16C 32/0448* (2013.01); *H01H 35/14* (2013.01); *H02N 15/00* (2013.01); *H04L 9/0637* (2013.01)

(58) Field of Classification Search
CPC ......... F16C 39/066; H01F 7/00; H01F 7/0236
See application file for complete search history.

(56) References Cited

U.S. PATENT DOCUMENTS

| | | | | |
|---|---|---|---|---|
| 5,168,183 A | * | 12/1992 | Whitehead ............ | F16C 32/044 104/284 |
| 5,315,247 A | * | 5/1994 | Kaiser ................. | G01P 15/0894 324/244 |

(Continued)

FOREIGN PATENT DOCUMENTS

| | | | |
|---|---|---|---|
| CN | 100401025 C | * | 7/2008 |
| EP | 846952 A1 | | 6/1998 |

OTHER PUBLICATIONS

K.T. Mc Donald, "Long Rod with Uniform Magnetization Transverse to its Axis," Princeton University, Nov. 1999 (6 pages).

(Continued)

*Primary Examiner* — Harshad R Patel
*Assistant Examiner* — Tran M. Tran
(74) *Attorney, Agent, or Firm* — Vazken Alexanian; Michael J. Chang, LLC

(57) ABSTRACT

A tunable and resettable shock sensor using a parallel dipole line (PDL) trap system is provided. In one aspect, a shock sensor includes: a PDL trap having a pair of diametric magnets separated from one another by a gap $g_M$, and a diamagnetic rod levitating in between the diametric magnets; and contact pads below the PDL trap, wherein the contact pads are separated from one another by a space that is less than a length l of the diamagnetic rod. A shock monitoring system is also provided that includes a network of the shock sensors, as is a method for shock monitoring using the shock sensors.

16 Claims, 8 Drawing Sheets

Vertical Shock Detection
(Cross section view)

(56) References Cited

U.S. PATENT DOCUMENTS

| | | | |
|---|---|---|---|
| 5,623,248 A * | 4/1997 | Min | B60R 25/1004 |
| | | | 340/429 |
| 5,642,089 A * | 6/1997 | Lysen | B23Q 3/1546 |
| | | | 335/285 |
| 5,814,774 A * | 9/1998 | Remmers | B60L 13/08 |
| | | | 187/292 |
| 6,142,007 A | 11/2000 | Yuze et al. | |
| 6,472,864 B1 * | 10/2002 | Emo | G01C 9/06 |
| | | | 200/61.45 R |
| 6,480,081 B1 | 11/2002 | Nakamura | |
| 7,250,855 B2 * | 7/2007 | Suenbuel | G08B 21/12 |
| | | | 340/511 |
| 7,810,373 B2 | 10/2010 | Amin et al. | |
| 7,859,157 B2 * | 12/2010 | Baur | H02N 15/00 |
| | | | 310/90.5 |
| 7,886,573 B2 * | 2/2011 | Zadesky | G01P 15/06 |
| | | | 73/12.01 |
| 8,144,380 B2 * | 3/2012 | Takeuchi | G02B 7/1821 |
| | | | 359/199.1 |
| 8,169,114 B2 * | 5/2012 | Simon | H02N 15/00 |
| | | | 310/12.31 |
| 8,258,663 B2 * | 9/2012 | Smoot | H02N 15/00 |
| | | | 310/90.5 |
| 8,259,066 B2 * | 9/2012 | Cheng | G06F 3/016 |
| | | | 156/161 |
| 8,375,767 B2 | 2/2013 | Zadesky et al. | |
| 8,895,355 B2 | 11/2014 | Cao et al. | |
| 8,947,356 B2 * | 2/2015 | Kurata | G06F 3/0346 |
| | | | 345/156 |
| 9,000,774 B2 * | 4/2015 | Gunawan | G01N 27/04 |
| | | | 324/629 |
| 9,041,389 B2 * | 5/2015 | Gokmen | F04D 11/00 |
| | | | 324/251 |
| 9,093,377 B2 | 7/2015 | Cao et al. | |
| 9,176,175 B2 * | 11/2015 | Gunawan | G01N 27/04 |
| 9,236,293 B2 | 1/2016 | Cao et al. | |
| 9,263,669 B2 * | 2/2016 | Cao | H01L 21/283 |
| 9,316,550 B2 | 4/2016 | Frangi et al. | |
| 9,424,971 B2 * | 8/2016 | Cao | H01L 21/283 |
| 9,576,853 B2 * | 2/2017 | Cao | H01L 21/76892 |
| 9,651,353 B2 * | 5/2017 | Gunawan | G01B 7/14 |
| 9,651,354 B2 * | 5/2017 | Gunawan | G01B 7/14 |
| 9,678,040 B2 * | 6/2017 | Gunawan | G01N 27/72 |
| 9,772,385 B2 * | 9/2017 | Gunawan | G01R 33/072 |
| 9,978,493 B2 * | 5/2018 | Gunawan | H01F 7/0236 |
| 10,031,058 B2 * | 7/2018 | Gunawan | G01N 11/16 |
| 10,082,408 B2 * | 9/2018 | Gunawan | G01D 5/24 |
| 2013/0147095 A1 * | 6/2013 | Kim | H01F 1/28 |
| | | | 264/496 |
| 2017/0299410 A1 * | 10/2017 | Gunawan | G01D 5/24 |
| 2017/0307412 A1 * | 10/2017 | Elliott | G01D 5/204 |
| 2019/0017965 A1 * | 1/2019 | Gunawan | G01N 27/72 |

OTHER PUBLICATIONS

Gunawan et al., "A parallel dipole line system," Applied Physics Letters 106, pp. 062407-1-5 (Feb. 2015).

Gunawan et al., "The one-dimensional camelback potential in the parallel dipole line trap: Stability conditions and finite size effect," J. Appl. Phys. 121, 133902 (Apr. 2017) (10 total pages).

Crosby, et al. "BlockChain Technology: Beyond Bitcoin," Applied Innovation Review, Issue No. 2, Jun. 2016 (16 pages).

Frangi et al., "Threshold Shock Sensor Based on a Bistable Mechanism: Design, Modeling, and Measurements", Journal of Microelectromechanical Systems, vol. 24, No. 6, pp. 2019-2026 (Dec. 2015).

* cited by examiner

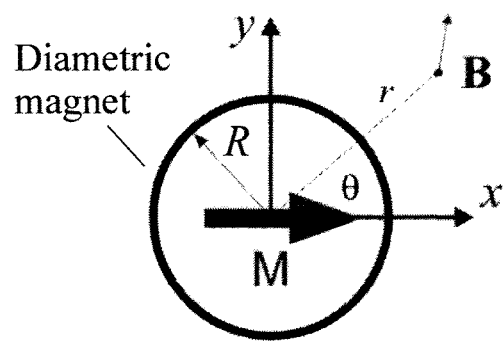
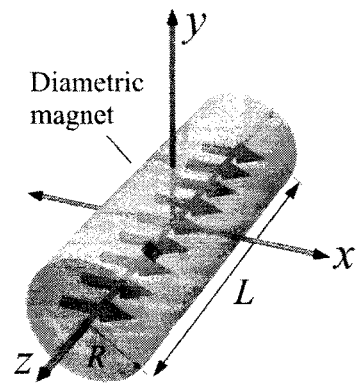
FIG. 1A　　　　　　　　　FIG. 1B
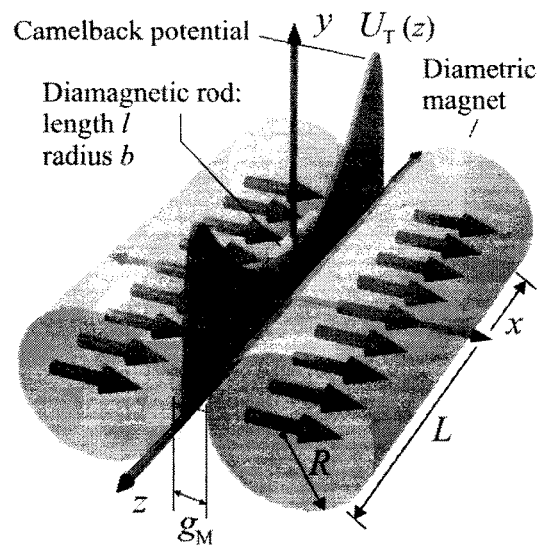
FIG. 2

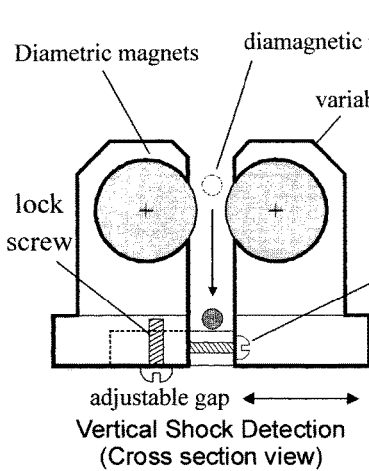
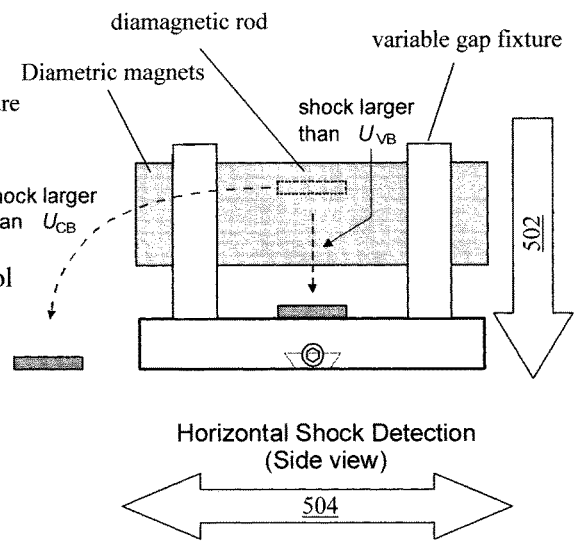
FIG. 5A
FIG. 5B
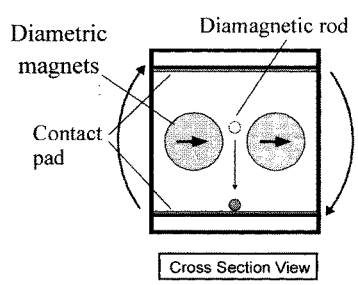
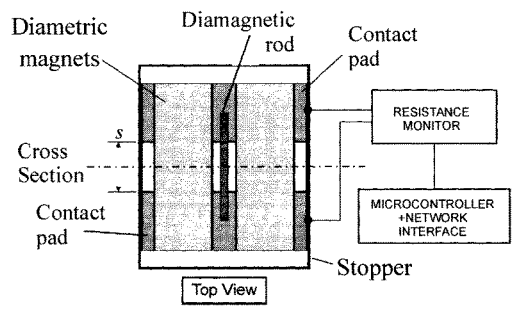
FIG. 6A
FIG. 6B

TUNABLE SHOCK SENSOR WITH PARALLEL DIPOLE LINE TRAP SYSTEM

FIELD OF THE INVENTION

The present invention relates to magnetic parallel dipole line (PDL) trap systems, and more particularly, to a tunable and resettable shock sensor using a PDL trap system.

BACKGROUND OF THE INVENTION

A shock sensor or impact monitor is a device that detects if certain physical shock or impact has occurred. Shock sensors are often used in the shipment of fragile, valuable items to indicate whether a potentially damaging drop or impact of the item may have occurred during transport.

Examples of shock sensors include accelerometers using microelectromechanical (MEMS) systems, spring-mass systems, magnetic balls which can be dislodged from a holder, liquid systems that monitor disruption of the liquid surface tension, devices made of inexpensive brittle components with a known fragility where breakage indicates excessive shock, etc. For instance, a common commercial shock sensor used during shipping simply includes a label having a liquid indicator that visibly changes color when rough handling (above a certain threshold value such as 25 g) occurs—where g is the acceleration of gravity.

One drawback to conventional shock sensors is that many of the above examples are limited to detecting a preset threshold, such as 25 g, of shock. Different items are, however, sensitive to different levels of shock. Since the sensitivity of conventional shock sensors is not tunable, a different sensor must be used to change the sensitivity. Another drawback is that most conventional shock sensors are one-time use only. Once the sensor is tripped, the change is permanent and the sensor must be replaced.

Therefore, improved shock sensor designs that are tunable, high sensitivity and resettable would be desirable.

SUMMARY OF THE INVENTION

The present invention provides a tunable and resettable shock sensor using a parallel dipole line (PDL) trap system. In one aspect of the invention, a shock sensor is provided. The shock sensor includes: a PDL trap having a pair of diametric magnets separated from one another by a gap $g_M$, and a diamagnetic rod levitating in between the diametric magnets; and contact pads below the PDL trap, wherein the contact pads are separated from one another by a space that is less than a length l of the diamagnetic rod.

In another aspect of the invention, a shock monitoring system is provided. The shock monitoring system includes: a network of shock sensors, each of the shock sensors comprising: i) a PDL trap having a pair of diametric magnets separated from one another by a gap $g_M$, and a diamagnetic rod levitating in between the diametric magnets, and ii) contact pads below the PDL trap, wherein the contact pads are separated from one another by a space that is less than a length l of the diamagnetic rod; and a block-chain ledger configured to record any shock-trigger events from the network of shock sensors.

In yet another aspect of the invention, a method for shock monitoring is provided. The method includes: providing at least one shock sensor comprising: i) a PDL trap having a pair of diametric magnets separated from one another by a gap $g_M$, and a diamagnetic rod levitating in between the diametric magnets, and ii) contact pads below the PDL trap, wherein the contact pads are separated from one another by a space that is less than a length l of the diamagnetic rod; varying the gap $g_M$ to tune a shock threshold of the at least one shock sensor; placing the at least one shock sensor that has been tuned with a product; and monitoring a state of the at least one shock sensor.

A more complete understanding of the present invention, as well as further features and advantages of the present invention, will be obtained by reference to the following detailed description and drawings.

BRIEF DESCRIPTION OF THE DRAWINGS

FIG. 1A is a diagram illustrating the parameters for modeling the magnetic field of a diametric or a transverse dipole line magnet in two-dimensions (2D) according to an embodiment of the present invention;

FIG. 1B is a diagram illustrating the parameters for modeling the magnetic field of a diametric magnet or transverse dipole line magnet in three-dimensions (3D) according to an embodiment of the present invention;

FIG. 2 is a schematic 3D diagram of a parallel dipole line (PDL) trap system illustrating the diametric magnet, diamagnetic rod and the camelback potential according to an embodiment of the present invention;

FIG. 5A is a front cross-sectional view of an exemplary configuration of the present PDL trap-based shock sensor according to an embodiment of the present invention;

FIG. 5B is a side view of the exemplary configuration of the present PDL trap-based shock sensor according to an embodiment of the present invention;

FIG. 6A is a front cross-sectional view of the present PDL trap vertical shock sensor and exemplary monitoring system according to an embodiment of the present invention;

FIG. 6B is a top view of the present PDL trap vertical shock sensor and exemplary monitoring system according to an embodiment of the present invention;

DETAILED DESCRIPTION OF PREFERRED EMBODIMENTS

Figures 3A, 3B, 3C:
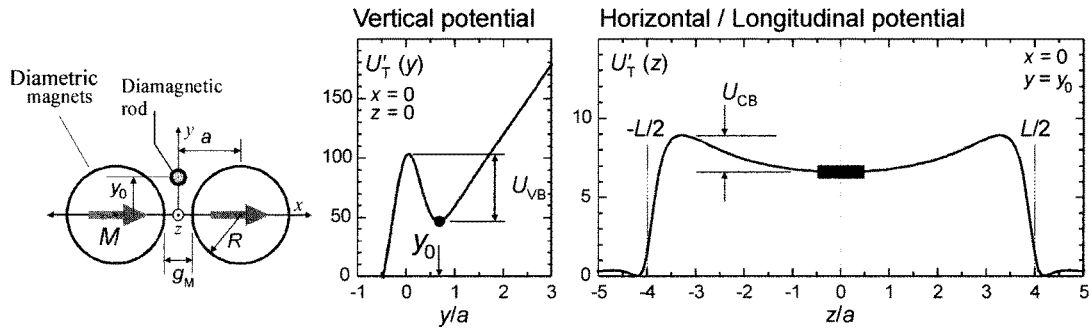
FIG. 3A is a diagram illustrating a gap $g_M$ having been opened between the PDL magnets according to an embodiment of the present invention.
FIG. 3B is a diagram illustrating the vertical energy potential for the diamagnetic rod in the PDL trap system of FIG. 3A according to an embodiment of the present invention.
FIG. 3C is a diagram illustrating the horizontal/longitudinal energy potential which is the camelback potential for the rod in the PDL trap system of FIG. 3A according to an embodiment of the present invention.

Provided herein are shock sensors based on a magnetic parallel dipole line (PDL) trap system which are tunable (i.e., the threshold can be varied) and highly sensitive. Further, once the sensor has been tripped, it can be reset. Thus the present shock sensors are not limited to only one-time use.

A PDL trap consists of a magnetic parallel dipole line system made of a pair of transversely magnetized cylindrical (i.e., diametric) magnets that naturally join together. A diametric magnet has a magnetization that is along the diameter of the magnet, as does a transverse dipole line magnet. Thus, a diametric magnet and a transverse dipole line magnetic are equivalents.

The system can trap a diamagnetic cylindrical object (such as a graphite rod) at the center. See, for example, Gunawan et al., "A parallel dipole line system," Applied Physics Letters 106, pp. 062407-1-5 (February 2015) (hereinafter "Gunawan 2015"); Gunawan et al., "The one-dimensional camelback potential in the parallel dipole line trap: Stability conditions and finite size effect," J. Appl. Phys. 121, 133902 (April 2017); and U.S. Pat. Nos. 8,895,355, 9,093,377, 9,236,293, and 9,263,669 all issued to Cao et al., entitled "Magnetic Trap for Cylindrical Diamagnetic Materials," the contents of each of which are incorporated by reference as if fully set forth herein.

The central feature of the PDL trap is the existence of a "camelback magnetic potential" along the longitudinal (z-axis), i.e., the magnetic field is enhanced near the edge of the dipole line which occurs for a diametric magnet with length L approximately L>2.5a, wherein a is the radius of the magnet. See, for example, FIG. 2 (described below).

In order to understand the present shock sensors, one must analyze the magnetic field distribution of cylindrical diametric magnet or a transverse dipole line magnet system. The magnetic field B of a very long (L>>a) cylindrical diametric magnet ($B_{DM}$) in two dimensions (2D) has been given by K. T. Mc Donald, "Long Rod with Uniform Magnetization Transverse to its Axis," Princeton University, November 1999 (6 pages), the contents of which are incorporated by reference as if fully set forth herein, as:

$$B_{DM}(x, y) = \frac{\mu_0 M R^2}{2(x^2 + y^2)^2}[(x^2 - y^2)\hat{x} + 2xy\hat{y}], \quad (1)$$

wherein M is the magnetization of the magnet, R is the magnet radius and $\mu_0$ is the magnetic permeability in vacuum. See, for example, FIG. 1A which illustrates the parameters for modeling the magnetic field of a dipole line or diametric magnet in 2D.

The magnetic field of a diametric magnet with finite length L in three-dimensions (3D) is given in Gunawan 2015 as:

$$B_{DM}(x, y, z) = \qquad (2)$$

$$\frac{\mu_0 M R}{4\pi} \int_0^{2\pi} \sum_{n=1,2} \frac{(-1)^n}{u_n^2 + s^2 + u_n\sqrt{u_n^2 + s^2}} \begin{bmatrix} x - R\cos\phi \\ y - R\sin\phi \\ u_n + \sqrt{u_n^2 + s^2} \end{bmatrix} \cos\phi d\phi,$$

wherein $s^2 = (x - R\cos\phi)^2 + (y - R\sin\phi)^2$, $u_{1,2} = z \pm L/2$ and L is the length of the magnet. See, for example, FIG. 1B which illustrates the parameters for modeling the magnetic field of a diametric magnet in 3D.

A PDL trap is obtained by placing two diametric magnets close together as shown in FIG. 2 with a separation gap $g_M$ in between the magnets. FIG. 2 is a schematic 3D diagram of a PDL trap system depicting the diametric magnets, diamagnetic rod and the camelback magnetic potential energy. The center axes of the magnets are positioned at $x = \pm a$ where $a = R + g_M/2$. Using the 2D and 3D magnetic field models above, the total magnetic field of a two dipole line (or parallel dipole line) system can be calculated as: $B_T(x, y, z) = B_{DM}(x - a, y, z) + B_{DM}(x + a, y, z)$. Afterwards one can calculate the total potential energy $U_T'$ (per unit volume) of the trapped rod. The total potential contains gravity and magnetic contribution. A small and short rod (b<<R, l<<L) approximation is used (b is the radius of the rod, l is the length of the rod):

$$U_T'(x, y, z) = \rho g y - \frac{2\chi}{\mu_0(\chi + 2)} B_T^2(x, y, z), \quad (3)$$

wherein $\chi$ is the magnetic susceptibility of the rod, p is the mass density of the rod, g is gravity, and x,y,z is the position of the rod. Plots of the confinement potentials in the PDL trap along y (vertical) and z (horizontal/longitudinal) direction are given in FIGS. 3B and 3C, respectively. The longitudinal potential shows the camelback potential profile that becomes the key feature in this PDL trap device.

At rest, the rod levitates above the magnets at the center of the PDL trap. This levitating effect is illustrated in FIG. 3A which provides a schematic representation of the rod trapped in the PDL trap and illustrates the relationship between the levitation height and the total energy potential. As shown in FIG. 3B, the equilibrium levitation height $y_0$ is achieved at the local minimum point of the vertical potential energy plot. The 2D magnetic field model is sufficient to describe the levitating effect of the rod at the center of the PDL trap by calculating the total potential energy (gravity and magnetic interaction). This allows one to calculate the equilibrium height $y_0$ (see Gunawan 2015) which satisfies:

$$\frac{\rho g a}{\mu_0 M^2} \frac{\chi + 2}{\chi} + f_Y(\bar{y}_0, \bar{L}) = 0, \text{ where} \quad (4)$$

$$f_{Y\infty}(\bar{y}) = 8\bar{y}(3 - \bar{y}^2)(1 - \bar{y}^2)/(1 + \bar{y}^2)^5 \text{ and } \bar{y} = y/a.$$

The levitation height of the rod above the PDL trap can be varied based on the size of the gap between the magnets. See, for example, U.S. patent application Ser. No. 15/131, 566 by Oki Gunawan, entitled "Parallel Dipole Line Trap with Variable Gap and Tunable Trap Potential" (hereinafter "U.S. patent application Ser. No. 15/131,566"), the contents of which are incorporated by reference as if fully set forth herein. As shown in FIGS. 5-9 of U.S. patent application Ser. No. 15/131,566, as the gap between the magnets is increased, the levitated diamagnetic rod will be lowered and finally falls at a critical gap ($g_C$) which is given as:

$$g_C = 2\sqrt[5]{\frac{-2.069\mu_0 M^2 R^4 \chi}{\rho g(2+\chi)}} - 2R. \tag{5}$$

As the gap $g_M$ increases, the confinement potentials (in the x, y, and z direction) in the PDL trap get weaker. This feature is leveraged herein to tune the potential barrier or the 'shock threshold' of the present shock sensor. Namely, by tuning the gap $g_M$ between the magnets in the PDL trap, the confinement potential is controlled and thereby the threshold force above which is needed to cause the rod to fall from the trap (see below).

Figures 4A, 4B:
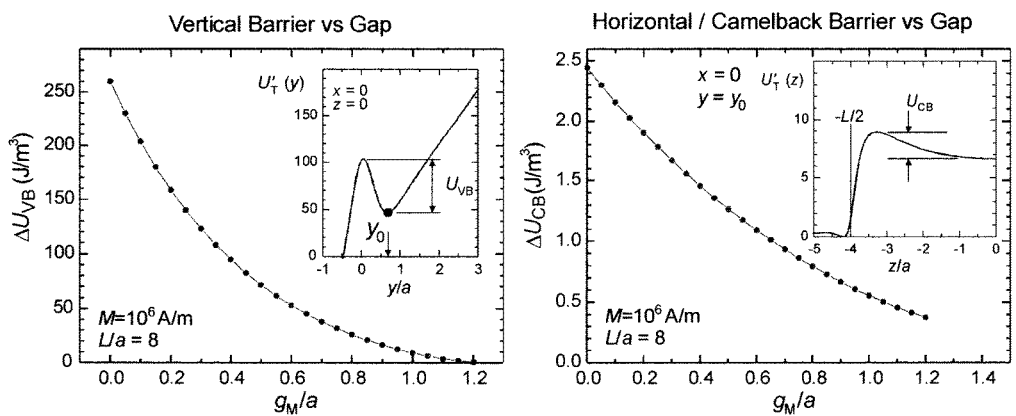
FIG. 4A is a diagram illustrating a reduction in the vertical barrier as the gap $g_M$ between the magnets is increased according to an embodiment of the present invention.
FIG. 4B is a diagram illustrating a reduction in the horizontal/longitudinal (camel-back) barrier as the gap $g_M$ between the magnets is increased according to an embodiment of the present invention.

For instance, the total energy potential of the rod can be calculated using Equation 3 above. See, for example, FIGS. 3A-C. In FIG. 3A, it is shown that a gap $g_M$ is opened between the PDL magnets and the rod is levitating at the equilibrium height $y_0$ above the magnets. FIGS. 3B and 3C illustrate the vertical energy potential $U_T'(y)$ and the horizontal/longitudinal energy potential $U_T'(z)$, respectively, of the rod calculated using Equation 3. Referring to FIGS. 4A and 4B it can be seen that as the gap $g_M$ between the magnets is increased, the vertical barrier ($\Delta U_{VB}$) is reduced until the rod falls (see FIG. 4A), and the horizontal longitudinal (camel-back) barrier ($\Delta U_{CB}$) is reduced (see FIG. 4B). Further, the potential 'stiffness' or spring constants in all directions $k_x, k_y, k_z$ reduce as the gap $g_M$ increases. The potential stiffness $k_x, k_y, k_z$ at equilibrium point is defined as: $k_i = \partial^2 U_T / \partial i^2$ where i is the spatial variable x,y,z.

An exemplary configuration of the present PDL trap-based shock sensor is depicted in FIGS. 5A (front cross-sectional view) and 5B (side view). In the example shown in FIGS. 5A and 5B, the diametric PDL magnets are each affixed to a variable gap fixture which functions to move the PDL magnets either closer together or farther apart from one another, thereby varying the gap $g_M$ between the magnets. Namely, as shown in FIG. 5A, each of the diametric PDL magnets is affixed to a separate mount. The positioning of the mounts (to which the PDL magnets are attached) relative to one another can be changed using an adjustment mechanism, such as a gap control screw, that connects one mount to the other. For instance, turning the gap control screw moves the mounts either closer together or farther apart from one another. A suitable variable gap fixture for use in accordance with the present techniques is described, for example, in U.S. patent application Ser. No. 15/131,566. As provided in U.S. patent application Ser. No. 15/131,566, once the fixture has been used to adjust the gap $g_M$ between the magnets, the fixture can be locked (e.g., via a lock screw) to lock in the set gap.

As illustrated in FIGS. 5A and 5B, if the shock is imparting energy to the rod beyond a certain value then the rod will fall. This energy is related to the acceleration as: $E_S = m\int a(t) dr$, where m is the mass of the rod, a is the given acceleration and r is the total displacement and t is time. Therefore if the shock energy exceeds the barrier energy, i.e., $E_S > \Delta U_B$ then the rod will fall out of the trap. More specifically, by controlling the gap $g_M$ between the diametric PDL magnets, the horizontal longitudinal (camel-back) barrier ($\Delta U_{CB}$) and the vertical barrier ($\Delta U_{VB}$) can be tuned (see above) thereby tuning the sensitivity of the shock sensor, i.e., via tuning the shock energy threshold which needs to be exceeded in order to cause the rod to fall from the trap.

More specifically, as FIGS. 5A and 5B illustrate depending on which way the rod falls from the PDL trap, i.e., vertically or horizontally, one can advantageously identify the amount of shock that occurs in the system. For instance, referring to FIG. 5A if the rod falls straight down between the diametric PDL magnets, i.e., vertically, then that means that the shock energy on the rod is larger than the vertical barrier ($\Delta U_{VB}$). On the other hand, if the rod falls to one side of the PDL trap, i.e., horizontally, then that means that the shock energy on the rod is larger than the horizontal longitudinal (camel-back) barrier ($\Delta U_{CB}$). Arrows 502 and 504 are provided on the side and bottom of FIG. 5B to indicate the motions (vertically and horizontally) of the shock sensor that, when larger than $\Delta U_{VB}$ and/or $\Delta U_{CB}$, will cause the rod to fall straight down or to one side of the PDL trap, respectively.

While monitoring the status of the sensor can be done by visible inspection to see whether the rod has fallen or not, it is preferable to have an automated method for detecting the state of the sensor. In the following exemplary embodiments, horizontal or vertical shock detection is performed separately (i.e., via different sensors). For instance, as will be described below, a stopper can be used for horizontal shock sensing to prevent the rod from falling due to vertical shock, and conversely a stopper can be used for vertical shock sensing to prevent the rod from falling due to horizontal shock. Thus, the vertical shock sensor would not detect horizontal shock, and vice versa. As such, according to an exemplary embodiment one or more horizontal shock sensors are employed in combination with one or more vertical shock sensors to monitor both horizontal and vertical shock. An exemplary monitoring system for vertical shock detection is described by way of reference to FIGS. 6A (front cross-sectional view) and 6B (top view). In this example, the present shock sensor uses (electrically conductive) contact pads under opposite ends of the PDL trap, such that if/when the rod drops from between the diametric PDL magnets, the rod will fall onto the contact pads and electrically connect the contact pads to one another. Since the rod is formed of an electrically conductive material, such as graphite, the rod will act as a short between the two contact pads. Preferably, the rod is confined between two walls of the magnet mount to prevent any horizontal shock from knocking the rod completely out of the trap. See, for example, FIG. 6B where a stopper is used at each end of the PDL trap to prevent the rod from being ejected horizontally from the trap. As shown in FIG. 6B, the stopper can simply be a block affixed to opposite ends of the magnets. Preferably, the stopper is formed from a non-ferro magnetic material such as aluminum, rubber, plastic, etc.

Specifically, referring first to FIG. 6B two contact pads are employed for vertical shock sensing beneath a center of the PDL trap. The contact pads are separated from one another by a space s (below a center of the PDL trap) that is less than the length l of the rod. When the rod is levitating in the PDL trap between the PDL magnets (see, for example, FIG. 6A) the two contact pads are not electrically connected. However, if/when the rod falls (in response to a shock exceeding the vertical and/or horizontal $\Delta U_{VB}$ and/or $\Delta U_{CB}$ thresholds) from the PDL trap onto the contact pads, the rod will bridge the space s between the contact pads, thereby (electrically) shorting the contact pads to one another.

The status of the sensor can be monitored simply by monitoring the resistance between the contact pads, e.g., via a resistance monitor. See, for example, FIG. 6B. Further, as will be described in detail below, the shock sensors can be connected to a network which aids in preventing device tampering. Accordingly, a microcontroller and network interface may be employed to communicate the sensor status to the network.

As provided above, in addition to being able to tune the sensitivity, another unique advantage of the present shock sensor devices is that they are resettable. Namely, once tripped the device can be easily reset to again monitor shock. One technique to reset the device is simply to put the rod (which has fallen) back into the PDL trap. Alternatively, the sensor can be configured symmetrically such that one merely has to flip the sensor over to reset it. See, for example, FIG. 6A. As shown in FIG. 6A, the sensor can be configured with the contact pads both above and below the center of the PDL trap (as described above). In one orientation one set of contact pads is directly above the center of the PDL trap and another set of the contact pads is directly below the center of the PDL trap.

When the sensor is tripped, the rod will fall onto the contact pads beneath the PDL trap in the manner described above. To reset the sensor, it merely needs to be flipped such that the contact pads above/below the PDL trap switch places. By this motion, gravity will cause the rod to fall back down over the PDL trap essentially resetting the sensor.

Figure 7A:
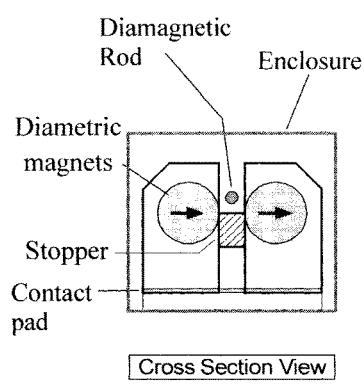
FIG. 7A is a front cross-sectional view of the present PDL trap horizontal shock sensor and exemplary monitoring system according to an embodiment of the present invention.
Figure 7B:
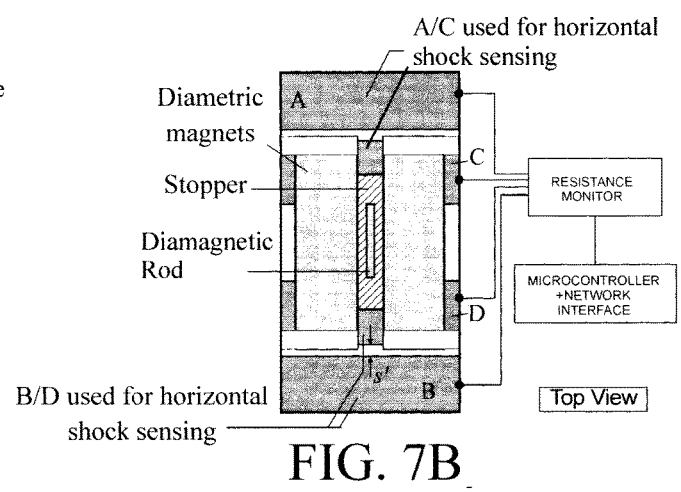
FIG. 7B is a top view of the present PDL trap horizontal shock sensor and exemplary monitoring system according to an embodiment of the present invention.

Similar techniques are implemented to detect horizontal shock as illustrated in FIGS. 7A (front cross-sectional view) and 7B (top view). As highlighted above, to single out detection of the horizontal shock component it may be desirable to prevent vertical shock from knocking the diamagnetic rod out of equilibrium. Thus, in this example, a stopper is placed in the gap between the magnets below the diamagnetic rod. See FIG. 7A. Namely, as shown in FIG. 7A this stopper (e.g., formed from a non-ferro magnetic material such as aluminum, rubber, plastic) prevents vertical shock from knocking the rod (vertically) down between the magnets. In other words, the vertical shock detected in the examples shown in FIGS. 6A and 6B is prevented from knocking the rod from the trap in this example. Conversely, the above-described stopper shown for example, in FIG. 6B prevents the horizontal shock detected in FIGS. 7A and 7B from knocking the rod from the PDL trap. As such, according to an exemplary embodiment, separate shock sensors are used for detecting vertical and horizontal shock. However, as shown in FIG. 7B, all of the components including the contact pads and the monitoring circuitry for both configurations can be included in each sensor, with just the placement of the stopper(s) and the contact pads being varied.

For horizontal shock sensing, two pairs of contact pads are employed, one pair under each of the opposite ends of the PDL trap. See FIG. 7B where there is a contact pad pair A/C under one end of the PDL trap and contact pad pair B/D under the opposite end of the PDL trap.

The pairs of contact pads A/C and the pair of contact pads B/D are separated from one another by a space s' that is less than the length l of the rod. When the rod is levitating in the PDL trap between the diametric PDL magnets (see, for example, FIG. 7A), the two contact pads in each pair are not connected to one another (i.e., contact pad A is not electrically connected to contact pad C, and contact pad B is not electrically connected to contact pad D). However, if/when the rod falls (in response to a shock exceeding the horizontal $\Delta U_{CB}$ thresholds) from the PDL trap onto the contact pads, the rod will bridge the space s' between the contact pads, thereby (electrically) shorting the contact pads of one pair (either A to C or B to D).

The status of the sensor can be monitored simply by monitoring the resistance between the contact pads, e.g., via a resistance monitor. See, for example, FIG. 7B. Further, as will be described in detail below, the shock sensors can be connected to a network which aids in preventing device tampering. Accordingly, a microcontroller and network interface may be employed to communicate the sensor status to the network.

Figure 8:
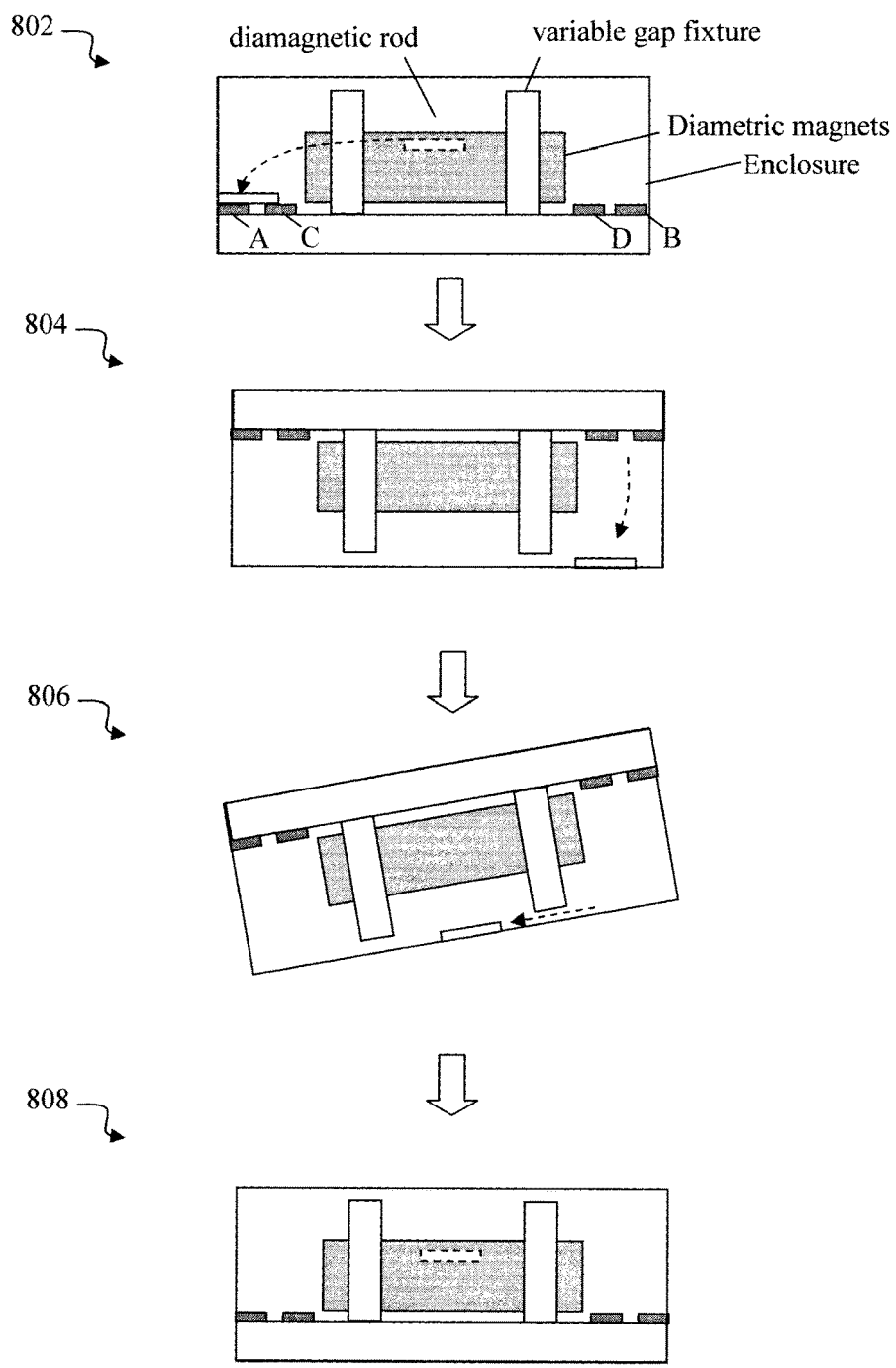
FIG. 8 is a diagram illustrating an exemplary methodology for resetting the present horizontal shock sensor according to an embodiment of the present invention.

As shown in methodology 800 of FIG. 8, the horizontal shock sensor device can also be reset by flipping it over. Namely, as shown in step 802 a horizontal shock occurs which knocks the rod out of the trap and onto the pair of contact pads under one end of the PDL trap (in this example the pair of contact pads A/C under the left side of the PDL trap). At this stage the sensor is triggered. To reset the sensor, in step 804 the sensor is flipped upside down causing the rod to fall from the contact pads onto the enclosure. In order to center the rod vis-à-vis the PDL trap, in step 806 the PDL trap is tilted to cause the rod to slide along the enclosure toward the center of the PDL trap. Once the rod is centered with the trap, in step 808 the PDL trap can be turned right-side up again and the rod will settle at the center of the PDL trap. Since the present sensors can be reset, there is a concern of device tampering whereby someone might impermissibly reset the sensor in order to cover up the fact that the sensor had already been tripped by a shock event. According to an exemplary embodiment, network block chain technology is used to address this tampering issue (see, e.g., Crosby, et al. "BlockChain Technology: Beyond Bitcoin," Applied Innovation Review, Issue No. 2, June 2016 (16 pages), the contents of which are incorporated by reference as if fully set forth herein). See, for example, FIG. 9. In general, a blockchain employs a distributed database containing a series of records or blocks. Each block is interlinked with another block which prevents the data in any given block from being modified. For instance, blockchain technology from International Business Machines Corporation provides an immutable ledger for recording the history of transactions.

With reference to the present shock sensor technology, a network of the present PDL trap shock sensors can be connected to a local area network (LAN). See, for example, in FIG. 9 where the PDL trap sensors are placed with a variety of different products during shipping. The products may be fragile and prone to damage if there is a shock exceeding a certain threshold. The above-described process for tuning the threshold of the present shock sensors may be employed to match the sensor sensitivity with the product shock tolerances.

The LAN is connected, e.g., via the internet, to a server(s) containing the blockchain ledger. Any shock-trigger events will be registered in the network and recorded in the block-chain ledger. Thus, administrators and/or clients will have a tamper-proof record of the status of their goods and the state of shock compliance via the shock sensors.

Figure 10:
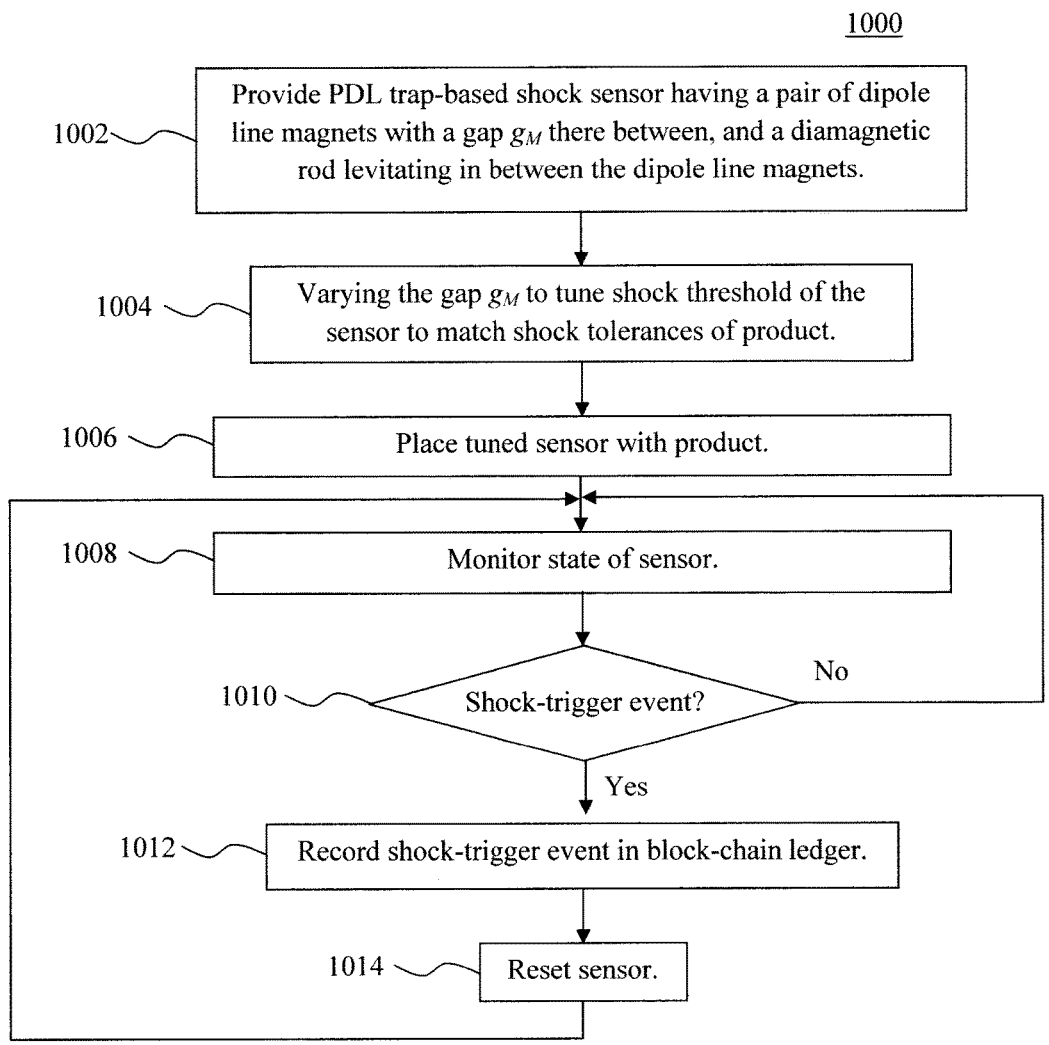
FIG. 10 is a diagram illustrating an exemplary methodology for detecting shock-trigger events according to an embodiment of the present invention.

FIG. 10 is a diagram illustrating an exemplary methodology 1000 for detecting shock-trigger events. In step 1002, at least one of the present PDL trap-based shock sensors is provided, and in step 1004, a shock threshold of the sensor is adjusted to match the shock tolerances of a product the sensor will be used to monitor. As provided above, present PDL trap-based shock sensors include a pair of dipole line magnets, and a diamagnetic rod levitating in between the dipole line magnets. The magnets are separated from one another by a gap $g_M$. The sensitivity of the sensor can be adjusted by varying the gap $g_M$ between the magnets.

The shock threshold needs to be exceeded in order to cause the rod to fall from the trap. Thus, the threshold should be adjusted in step 1004 to be less than the shock tolerances of the product. The shock tolerances of the product are simply the amount of shock the product can withstand (e.g., during shipping) without being damaged. Of course, this shock tolerance varies for different products, and such data can be obtained from the manufacturer. The shock threshold for the sensor can be pre-correlated with gap $g_M$ values simply by varying the gap $g_M$ between the PDL magnets and noting the amount of shock (vertical and horizontal) that is needed to cause the rod to fall from the trap for each value of g.

In step 1006, the tuned PDL trap-based shock sensor is then placed with the product. For instance, the PDL trap-based shock sensor can be placed individually within the product packaging, and/or in a container containing multiple products.

In step 1008, the state of the PDL trap-based shock sensor is monitored. For instance, as provided above, the sensor can be equipped with contact pads beneath the PDL trap that are shorted together when the rod falls from the PDL trap. Thus, monitoring the state of the PDL trap-based shock sensor in that case can involve monitoring the resistance of the contact pads.

In step 1010, a determination is made as to whether a shock-trigger event has occurred. If it is determined in step 1010 that (No) a shock-trigger event has not occurred, then the process continues to monitor the state of the PDL trap-based shock sensor. On the other hand, if it is determined in step 1010 that (Yes) a shock-trigger event has occurred, then in step 1012 the shock-trigger event is recorded in a blockchain ledger. The sensor can then be reset in step 1014, and the monitoring continued as per step 1008. A shock-trigger event implies that the sensor (and associated product) has been subjected to (vertical and/or horizontal) shock forces exceeding the shock threshold, and which have caused the rod to fall from the PDL trap.

Figure 9:
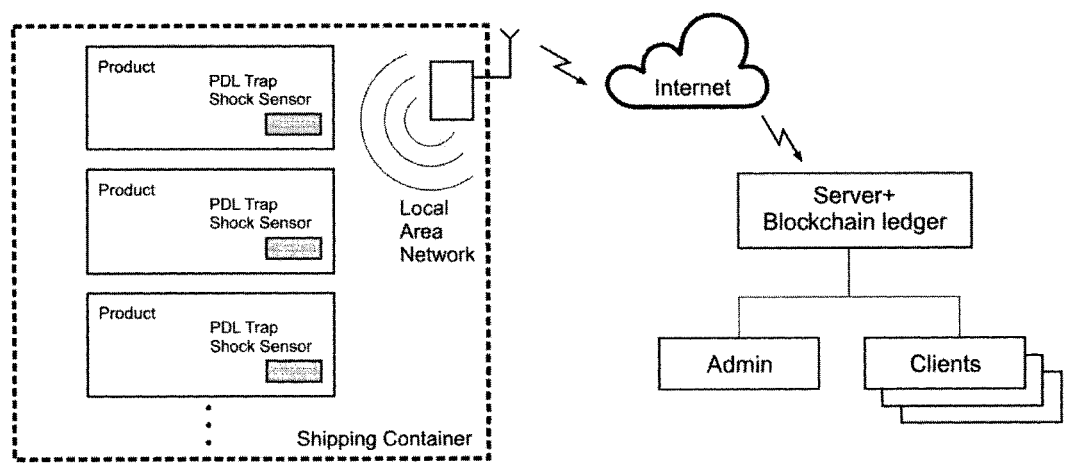
FIG. 9 is a diagram illustrating a tamper-proof shock monitoring system using the present PDL trap-based shock sensors according to an embodiment of the present invention.
Figure 11:
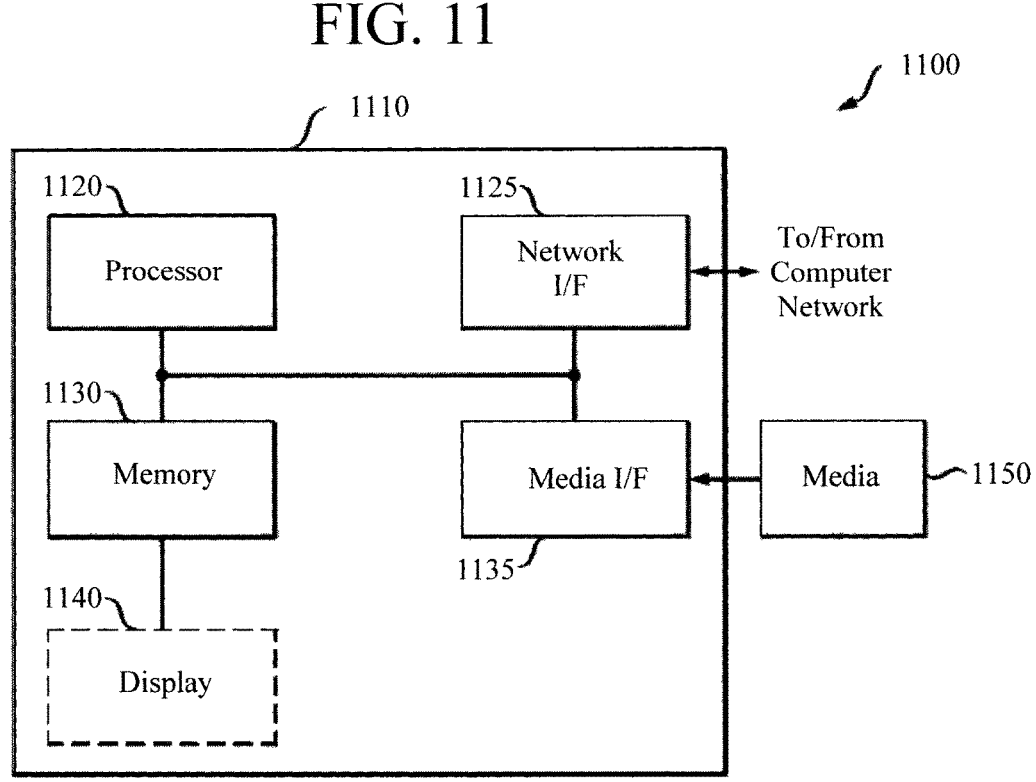
FIG. 11 is a diagram illustrating an exemplary apparatus for implementing network block-chain technology according to an embodiment of the present invention.

Turning now to FIG. 11, a block diagram is shown of an apparatus 1100 that can be configured, for example, as the blockchain ledger server (see FIG. 9, described above). Apparatus 1100 includes a computer system 1110 and removable media 1150. Computer system 1110 includes a processor device 1120, a network interface 1125, a memory 1130, a media interface 1135 and an optional display 1140. Network interface 1125 allows computer system 1110 to connect to a network, while media interface 1135 allows computer system 1110 to interact with media, such as a hard drive or removable media 1150.

Processor device 1120 can be configured to implement the methods, steps, and functions disclosed herein. The memory 1130 could be distributed or local and the processor device 1120 could be distributed or singular. The memory 1130 could be implemented as an electrical, magnetic or optical memory, or any combination of these or other types of storage devices. Moreover, the term "memory" should be construed broadly enough to encompass any information able to be read from, or written to, an address in the addressable space accessed by processor device 1120. With this definition, information on a network, accessible through network interface 1125, is still within memory 1130 because the processor device 1120 can retrieve the information from the network. It should be noted that each distributed processor that makes up processor device 1120 generally contains its own addressable memory space. It should also be noted that some or all of computer system 1110 can be incorporated into an application-specific or general-use integrated circuit.

Optional display 1140 is any type of display suitable for interacting with a human user of apparatus 1100. Generally, display 1140 is a computer monitor or other similar display.

Although illustrative embodiments of the present invention have been described herein, it is to be understood that the invention is not limited to those precise embodiments, and that various other changes and modifications may be made by one skilled in the art without departing from the scope of the invention.

What is claimed is:

1. A shock sensor, comprising:
   a parallel dipole line (PDL) trap having a pair of diametric magnets separated from one another by a gap $g_M$ which is variable, and a diamagnetic rod levitating in between the diametric magnets; and
   electrically conductive contact pads below the PDL trap, wherein the electrically conductive contact pads are separated from one another by a space that is less than a length l of the diamagnetic rod such that when shock knocks the diamagnetic rod from the PDL trap the diamagnetic rod will connect the electrically conductive pads to one another forming a short between the electrically conductive pads,
   wherein the diametric magnets are each affixed to a variable gap fixture configured to move the diametric magnets closer together or farther apart from one another to vary the gap $g_M$ and control a confinement potential of the PDL trap to thereby tune a shock threshold force above which is needed to knock the diamagnetic rod from the PDL trap.

2. The shock sensor of claim 1, wherein two of the electrically conductive contact pads are present below a center of the PDL trap.

3. The shock sensor of claim 1, wherein a pair of the electrically conductive contact pads is present below each end of the PDL trap.

4. The shock sensor of claim 1, further comprising:
   two other electrically conductive contact pads present above a center of the PDL trap.

5. A shock monitoring system, comprising:
   a network of shock sensors, each of the shock sensors comprising: i) a PDL trap having a pair of diametric magnets separated from one another by a gap $g_M$ which is variable, and a diamagnetic rod levitating in between the diametric magnets, and ii) electrically conductive contact pads below the PDL trap, wherein the electrically conductive contact pads are separated from one another by a space that is less than a length l of the diamagnetic rod such that when shock knocks the diamagnetic rod from the PDL trap the diamagnetic rod will connect the electrically conductive pads to one another forming a short between the electrically conductive pads, wherein the diametric magnets are each affixed to a variable gap fixture configured to move the diametric magnets closer together or farther apart from one another to vary the gap $g_M$ and control a confinement potential of the PDL trap to thereby tune a shock threshold force above which is needed to knock the diamagnetic rod from the PDL trap; and
   a blockchain ledger configured to record any shock-trigger events from the network of shock sensors.

6. The shock monitoring system of claim 5, wherein the network of shock sensors is connected to a local area network.

7. The shock monitoring system of claim 6, wherein the local area network is connected to the blockchain ledger via the Internet.

8. The shock monitoring system of claim 5, wherein two of the electrically conductive contact pads are present below a center of the PDL trap.

9. The shock monitoring system of claim 5, wherein a pair of the electrically conductive contact pads is present below each end of the PDL trap.

10. A method for shock monitoring, comprising the steps of:
provinding at least one shock sensor comprising: i) a PDL trap having a pair of diametric magnets separated from one another by a gap $g_M$ which is variable, and a diamagnetic rod levitating in between the diametric magnets, and ii) electrically conductive contact pads below the PDL trap, wherein the electrically conductive contact pads are separated from one another by a space that is less than a length l of the diamagnetic rod such that when shock knocks the diamagnetic rod from the PDL trap the diamagnetic rod will connect the electrically conductive pads to one another forming a short between the electrically conductive pads, wherein the diametric magnets are each affixed to a variable gap fixture configured to vary the gap $g_M$ between the diametric magnets;
varying the gap $g_M$ by using the variable gap fixture to move the diametric magnets closer together or farther apart from one another to control a confinement potential of the PDL trap and thereby tune a shock threshold force of the at least one shock sensor above which is needed to knock the diamagnetic rod from the PDL trap;
placing the at least one shock sensor that has been tuned with a product; and
monitoring a state of the at least one shock sensor.

11. The method of claim 10, further comprising the step of:
determining whether a shock-trigger event has occurred, wherein the shock trigger event exceeds the shock threshold force of the at least one shock sensor and causes the diamagnetic rod to fall from the PDL trap onto and shorting the at least two electrically conductive contact pads.

12. The method of claim 11, further comprising the step of:
monitoring a resistance between the electrically conductive contact pads.

13. The method of claim 11, wherein a shock-trigger event has occurred, the method further comprising the step of:
recording the shock-trigger event in a blockchain ledger.

14. The method of claim 13, further comprising the steps of:
resetting the at least one shock sensor; and
continue monitoring the state of the at least one shock sensor.

15. The method of claim 14, wherein the at least one shock sensor further comprises two other electrically conductive contact pads present above a center of the PDL trap.

16. The method of claim 15, wherein the step of resetting the at least one shock sensor comprises the step of:
flipping the at least one shock sensor.

* * * * *